United States Patent [19]

Hahn, Jr.

[11] Patent Number: 4,853,422

[45] Date of Patent: * Aug. 1, 1989

[54] THERMOSETTING ARCYLIC LATEXES

[75] Inventor: Kenneth G. Hahn, Jr., Hinckley, Ohio

[73] Assignee: The Glidden Company, Cleveland, Ohio

[*] Notice: The portion of the term of this patent subsequent to Mar. 1, 2005 has been disclaimed.

[21] Appl. No.: 265,009

[22] Filed: Oct. 31, 1988

Related U.S. Application Data

[60] Division of Ser. No. 157,256, Feb. 18, 1988, Pat. No. 4,812,491, which is a continuation-in-part of Ser. No. 100,537, Sep. 24, 1987, Pat. No. 4,789,694.

[51] Int. Cl.$^4$ .......................... C08J 3/08; C08L 61/00
[52] U.S. Cl. ....................................... 523/310; 524/512
[58] Field of Search .......................... 523/310; 524/512

[56] References Cited

U.S. PATENT DOCUMENTS

| | | | |
|---|---|---|---|
| 3,022,260 | 2/1962 | Miller et al. | 523/310 |
| 3,048,556 | 8/1962 | Miller | 523/310 |
| 3,511,799 | 5/1970 | Clampitt | 523/310 |
| 3,577,375 | 5/1971 | Clampitt | 523/310 |
| 3,823,106 | 7/1974 | Kimura | 523/310 |
| 3,989,649 | 11/1976 | Kaiho et al. | 523/310 |
| 4,012,351 | 3/1977 | Hall et al. | 524/106 |
| 4,369,266 | 1/1983 | Kuhls et al. | 523/310 |
| 4,442,247 | 4/1984 | Ishikura et al. | 524/512 |
| 4,442,248 | 4/1984 | Kanda et al. | 524/512 |
| 4,442,257 | 4/1984 | Borovicka, Sr. et al. | 524/555 |
| 4,444,941 | 4/1984 | Borovicka, Sr. et al. | 525/375 |
| 4,487,889 | 12/1984 | Craun | 524/512 |
| 4,512,860 | 4/1985 | Abbey et al. | 428/461 |
| 4,525,260 | 6/1985 | Abbey et al. | 524/555 |
| 4,525,535 | 6/1985 | Craun et al. | 524/512 |
| 4,540,735 | 9/1985 | Borovicka, Sr. | 524/512 |
| 4,542,180 | 9/1985 | Carlson et al. | 524/512 |

FOREIGN PATENT DOCUMENTS

| | | | |
|---|---|---|---|
| 1131013 | 6/1962 | Fed. Rep. of Germany | 523/310 |
| 3217564 | 11/1983 | Fed. Rep. of Germany | 523/310 |

*Primary Examiner*—Joseph L. Schofer
*Assistant Examiner*—N. Sarofim
*Attorney, Agent, or Firm*—Thomas M. Schmitz

[57] ABSTRACT

A paint coating comprising a self-curing emulsion polymer having functional carboxyl groups or hydroxyl groups as well as alkylol acrylamide, but is substantially free of amine groups, where the self-curing emulsion polymer is ion-exchanged to render said polymer self-curing.

5 Claims, No Drawings

4,853,422

THERMOSETTING ARCYLIC LATEXES

BACKGROUND OF THE INVENTION

This is a division of application Ser. No. 157,256, filed Feb. 18, 1988 now U.S. Pat. No. 4,812,491 which is a continuation-in-part of Ser. No. 100,537 filed Sept. 24, 1987, U.S. Pat. No. 4,789,694 and the same is incorporated herein by reference.

This invention relates to polymeric compositions and processes particularly useful in protective surface paint coatings based on certain reactive emulsion polymers adapted to be self-curing latex binders. The self-curing polymers include copolymerized functional monomers (except amine) in conjunction with alkyloacrylamide monomer to render the polymer self curing. The self-curing or self-reacting polymer is ion exchanged to render a substantially improved ambient curing, self-crosslinking polymer.

Functional latexes are known such as suggested in U.S. Pat. No. 3,991,216 based on interpolymers of copolymerized acrylamide monomer, carboxylic monomer, and other ethylenically unsaturated monomers. Other patents disclosing similar latexes are U.S. Pat. No. 2,978,434 and U.K. Pat. No. 2,034,334, which suggest that premature condensation of emulsion copolymerized alkylol acrylamide derivatives with functional monomers having carboxyl, hydroxyl, or similarly reactive functional groups can be eliminated by copolymerization in two stages. These references teach that first stage monomers contain no alkylol acrylamide monomer and are copolymerized under acidic conditions at 70°-80° C., but second stage monomers containing an alkylol acrylamide together with other functional monomers containing hydroxyl or carboxyl groups are copolymerized under neutral or slightly alkaline conditions at temperatures no greater than 50° C. The disclosed two-stage processes avoid condensation reactions until the coating is baked as a film onto the desired substrate. Similarly, Journal of Coatings Technology, Vol. 51, No. 657 (October 1979) discloses low molecular weight acrylamide latexes adapted to crosslink upon curing as a film.

U.S. Pat. No. 4,499,212 discloses a high molecular weight two-stage thermosetting acrylic emulsion copolymer containing crosslinked surface polymer chains and carboxyl and methylol acrylamide functionalities particularly useful in the formulation of coatings. Reactive self-curing latexes containing copolymerized monomers including functional carboxyl, hydroxyl, amine or amide monomers in combination with alkylol acrylamide monomers is polymerized in a stepwise reaction to concentrate the alkylol acrylamide on the surface of the latex polymer particles. The second stage polymerization takes place at temperatures above about 70° C. wherein a minor amount of alkylol acrylamide reacts with a minor amount of functional monomer during the addition polymerization of ethylenic monomers to produce crosslinked polymer chains in the polymer surface.

It now has been found that stabilized self-curing latexes containing copolymerized monomers comprising reactive carboxyl and hydroxyl monomers in combination with alkylol acrylamide monomers, but substantially free of amine monomers provide a self-curing thermosetting latex. In accordance with this invention, the self-curing latex is ion exchanged to obtain a low pH, preferably below 2.5, to provide an excellent self-curing thermosetting latex that can be heat cured or ambient cured without external cross-linking agents. It has been found that ambient dry consumer trade sales latex paint compositions (wall and ceiling paints, etc.) can be formulated to produce highly desired air dry films which further crosslink over a period of time to produce substantially improved film integrity properties. Prior to this invention, conventional air dry consumer paints dried by evaporation of water and subsequent coalescence of binder polymer particles, but such binders were merely coalesced and not crosslinked. In said commonly assigned Ser. No. 100,537, reactive emulsion polymers are crosslinked with glycoluril. In accordance with this invention, the binder polymer particles coalesce but then further crosslink at ambient room temperature or heat cured without the need for external crosslinker such as malamine or glycoluril. Upon the passage of several days, a substantially improved crosslinked film is formed. Elimination of crosslinkers substantially reduces or eliminates undesirable formaldehyde emissions. Hence, excellent room temperature cured consumer paints can be produced to be soft enough to provide excellent film formation and will subsequently crosslink at ambient room temperature to form a cured thermoset paint film exhibiting superior film integrity properties.

In accordance with this invention, an ambient or heat cured latex paint free of melamine or glycoluril-type crosslinkers and coreactive binder polymers can be produced by using conventional surfactants, where the mixture is subsequently subjected to cationic exchange to remove the cations from the anionic surfactant as well as from other sources. The emulsion binder polymer specifically contains hydroxyl and/or carboxyl groups as well as alkyl acrylamide groups, but not amine groups. Amine groups block reactivity, inhibiting cure and render the ionic exchange process of this invention inoperative. The resulting cationic exchange step produces a clear emulsion mixture adapted to cure at room temperature without the addition of acid catalysts such as p-toluenesulfonic acid, and hence, the disadvantages associated with the use of external acid catalysts are overcome by this invention. Dynamic mechanical analysis further demonstrates that the ambient cure achieved by ion exchange is faster than by acid catalysts. The pigmented or clear mixtures exhibit excellent uninhibited cure along with long-term viscosity stability. The cation exchange treatment of the self-curing latex is stable against settling and exhibits no flocculation. The ion-exchange process utilized a proton-substituted cation exchange resin to remove cations which unexpectedly yields an ambient cure liquid coating with long term package stability as compared with the acid-catalyzed liquid coating which reacts quickly but typically destabilizes and gels in 1–5 days at room temperature. The improved clear or pigmented emulsion coatings of this invention are indefinitely stable at room temperature yet, upon drying, thermoset at room temperature to give a fully crosslinked film. These and other advantages of the invention will become more apparent by referring to the specification and illustrative examples.

SUMMARY OF THE INVENTION

Briefly, the invention pertains to a stabilized, self-curing coating based on a self-curing or self-reactive emulsion polymer of copolymerized monomers comprising carboxy or hydroxy monomer in combination with alkylol acrylamide monomer, but substantially free of amine monomers, where the self-curing polymer is subsequently treated with an ion exchange step to reduce the pH below about 2.5. The coating can be clear, but preferably pigmented, and can be self-cured at ambient room temperatures or with moderate heat by crosslinking the alkylol acrylamide groups with the functional hydroxyl or carboxyl groups.

DETAILED DESCRIPTION OF THE INVENTION

The self-curing coating is based on copolymerized ethylenically unsaturated monomers containing carbon to carbon double bond unsaturation to produce a self-curing functional latex adapted to self crosslink.

In accordance with this invention, the composition comprises certain reactive self-curing latexes, wherein the reactive self-curing latex polymer is an emulsion polymer of copolymerized ethylenically unsaturated monomers comprising (i) reactive carboxyl or hydroxyl functional monomers, (ii) alkylol acrylamide and preferably alkylated alkylol acrylamide monomers, and (iii) other ethylenically unsaturated monomers, but excluding amine monomers.

Functional monomers include carboxyl and hydroxyl functional groups containing monomers. Carboxyl containing monomers include acrylic acid and lower alkyl substituted acrylic acids wherein the preferred carboxylic monomers are acrylic and methacrylic acids. Hydroxyl containing monomers are hydroxy containing ethylenically unsaturated monomers including hydroxy alkylacrylates such as 2-hydroxyl ethyl acrylate and methacrylate, 2-hydroxypropyl acrylate and methacrylate, and similar hydroxyl alkyl acrylates. The alkylated alkylol acrylamide monomers can be derivates of acrylamide, methacrylamide, methylol acrylamide, or similar alkyl modified acrylamide monomer as shown for example in U.S. Pat. Nos. 3,991,216; 4,097,438; and 4,305,859. The acrylamide monomers preferably are alkylated with an alkyl group such as methyl, ethyl, propyl, n-butyl or iso-butyl, and similar alkylated alkylol acrylamide monomers, wherein the butylated monomers are preferred. The amido containing monomers include acrylamide and methacrylamide or similar alkyl alkylol acrylamide monomers. Other reactive monomers include N-methylol acrylamide or methacrylamide monomers.

The remaining ethylenically unsaturated monomers that can be copolymerized with the alkylol acrylamide monomer and functional monomers to form a reactive self-curing latex polymer are other ethylenically unsaturated monomers including vinyl monomers, for example, vinyl esters such as vinyl acetate, vinyl proprionate, vinyl butyrates, vinyl benzoate, isopropenyl acetate and similar vinyl esters; and vinyl halides such as vinyl chloride. Other ethylenically unsaturated monomers can include, for example, those monomeric materials exhibiting ethylenic double bond unsaturation such as polymerization allylic, acrylic, or like ethylenically unsaturated double bond functionality. Ethylenically unsaturated monomers can include, for example, styrene, methyl styrenes, and similar alkyl styrene, chlorostyrene, vinyl toluene, vinyl naphthalene, divinyl benzene, diallyl phthalate and similar diallyl derivatives, butadiene, alkyl esters of acrylic and methacrylic acid and similar ethylenically unsaturated monomers. Further suitable ethylenically unsaturated monomers include acrylic unsaturated monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reation products such as butyl, phenyl, and cresyl glycidyl esters reacted with acrylic and methacrylic acids and hydroxyl alkyl acrylates and methacrylates.

On a weight basis, the copolymer contains copolymerized monomers commprising between 0.5% and 20% hydroxyl monomer and/or 0.1% and 10% carboxyl monomer in combination with 0.1% to 10% alkylol acrylamide and preferably alkyl alkylol acrylamide monomer, with the balance being other ethylenically unsaturated monomers; provided that the polymer is substantially free of copolymerized amine monomers or otherwise amine group functionality incorporated into the copolymer.

In accordance with this invention, the polymer is substantially free of copolymerized ethylenically unsaturated amino compounds. Example of ethylenically unsaturated basic amino compounds are aminoalkyl esters of acrylic and/or methacrylic acid such as the aminomethyl, aminoethyl, aminopropyl, aminobutyl and aminohexyl esters, N-aminoalkyl acrylamides or methacrylamides, such as aminomethylacrylamide, 1-aminoethyl-2-acrylamide, 1-aminopropyl-2-methacrylamide, N-1-(N-butylamino) propyl-(3)-acrylamide and 1-aminohexyl-(6)-acrylamide and 1-(N,N,-dimethylamino)-ethyl-(2)-methacrylamide, 1-(N,N-dimethylamino)-propyl-(3)-acrylamide and 1-(N,N-dimethylamino)-hexyl-(6)-methacrylamide.

The emulsion polymer of this invention specially contains hydroxyl and/or carboxyl groups, but not amine groups, and is adapted to be coreactive and self-curing with alkylol acrylamide groups. Amine groups block reactivity, inhibit the cure, and render the process of this invention inoperative. In accordance with this invention, the ion-exchange process for removing undesirable cations from the polymeric binder can be utilized in conjunction with specific opacified pigments substantially free of cations or cationic surface treatment. The self-curing polymeric binder is treated with an ion-exchange resin to remove undesirable cations from the polymeric binder. Post ion-exchange treatment is best effected with protonated cation exchange resin. Protonated cation exchange resin typically comprises crosslinked macroreticular polystyrene beads having sulfonic acid surface groups, that is, the beads have a sulfonated surface. Bead sizes are typically about 1 millimeter in diameter more or less. In the present invention, the coating is not externally catalyzed, but is brought into intimate contact with a protonated cation exchange resin, such as Amberlite 200 CH from Rohm and Haas. This contact can be effected by adding from 1%–100% by weight of the exchange resin to the coating with agitation and mixing until the pH has stabilized below 2.5, and typically around 1.2–1.8. The mixture can be strained through a filter medium such as linen cloth of a size small enough to remove all of the solid exchange resin, whereby the filtered coating exhibits no changes in pH or viscosity over 3 months or longer. The coating can be passed over a column bed of the exchange resin at a rate which yields a coating pH of less than 2.5, preferably around 1.2–1.8. The ionexchange imparts no change in stability or in pH or viscosity over a 3-month period.

In practice, the ethylenic monomers can be polymerized in an aqueous medium at a pH preferably between about 1.0 and 6 to form a self-curing emulsion polymer having a pH above 2.5. Generally, the polymerization is conducted at a temperature of about 20°–100° C. in the presence of a free radical generating initiator. Commonly used free radical initiators include various peroxygen compounds such as the persulfates, benzoyl peroxide, t-butyl hydroperoxide, cumene hydroperoxide, di-t-butyl perphthalate, pelargonyl peroxide and 1-hydroxycyclohexyl hydroperoxide. Particularly preferred as polymerization initiators are the water-soluble peroxygen compound such as hydrogen peroxide and the sodium, potassium and ammonium persulfates used by themselves or in activated "redox" type systems. Typical "redox" systems include alkali metal persulfates with a reducing substance such as a polyhydroxy phenol. The amount of initiator used will generally be in the range between about 0.1 to 3% by weight based on the monomers and preferably is maintained between 0.15 and 1% by weight of the monomers. Usually the initiator will all be charged at the outset of the polymerization, although incremental addition or proportioning of the initiator can be often employed.

Emulsifiers used to prepared the latices of this invention are the general types of anionic and non-ionic emulsifiers. Exemplary anionic emulsifiers which may be employed are: alkali metal or ammonium salts of the sulfates of alcohols having from 8 to 18 carbon atoms, such as sodium lauryl sulfate, ethanolamine lauryl sulfate, ethylamide lauryl sulfate; alkali metal and ammonium salts of sulfontated petroleum or paraffin oils, sodium salts of aromatic sulfonic acids, such as dodecane-1-sulfonic acid and octadiene-1-sulfonic acid; aralkylsulfonates such as sodium isopropyl benzene sulfonate, sodium dodecyl benzene sulfonate and sodium isobutyl naphthalane sulfonate; alkali metal and ammonium salts of sulfonated dicarboxylic acid esters such as sodium dioctyl sulfosuccinate, disodium N-octadecyl-sulfosuccinamate; alkali metal or ammonium salts of free acids of complex organic mono- and diphosphate esters and the like. So-called non-ionic emulsifiers such as octyl- or nonylphenyl polyethyoxyethanol and the like may also be used.

The amount of emulsifier used can be from about 0.01 to 6% or more by weight of the monomers. All of the emulsifier may be added at the beginning of the polymerization or may be added incrementally or by proportioning throughout the run. Typical polymerizations for the preparation of the emulsion polymers of this invention are conducted by charging the monomers into the polymerization reactor which contains water and a portion of the emulsifying agent. The reactor and its contents are heated and the initiator added.

A pigmented coating can be prepared by blending the emulsion with cation-free opacifying pigments. Cation-free opacifying pigments contain less than about 0.5% by weight residual aluminum and preferably are essentially free of cations including aluminium cations. A uniform dispersion of pigments can be obtained, using conventional anionic and nonionic surfactants. The resulting self-curing emulsion polymer is stable and shows no flocculation over extended periods of time. Accorindingly, a stable dispersion can be made using conventional surfactants which subsequently can be acidified by cation exchange to provide compatibility and stability in let down steps and pigment grinds if desired. Conventional basic surfactant can be used as the dispersant to enable a dilatent-free pigment grind. Cation exchange prevents settling and flocculation and further prevents cure inhibition in the final paint.

The following examples, wherein percentages are by weight, further illustrate the merits of this invention.

EXAMPLE 1

A latex containing:
39.1% Butyl Acrylate
49% methyl methacrylate
6% hydroxy ethyl acrylate
1.9% N-Methylol acrylamide
4.0% Methacrylic Acid
was prepared by conventional emulsion polymerization techniques and employed in this and the following examples.

A 3 mil bird application of this latex was applied to glass and baked in a 250° F. oven for 2 minutes. A second sample was cation exchanged with Amberlite 200 CH to a CH of 1.84. Applied to glass, baked 2 hours at 250° F.

|  | MEK Rubs |
| --- | --- |
| Latex, as is | 83 to Break through |
| Latex, exchanged | 200 to soften |

A similar sample with tetramethylol glycoluril (TMGU) or dihydroxy diethoxy ethylene urea (DDEU) showed no cure unless exchanged or catalyzed.

EXAMPLE 2

|  | Grams |
| --- | --- |
| Letdown: | |
| Latex | 438.6 |
| Defoamer | 1.0 |
| *mix 30 minutes | |
| Grind: | |
| Deionized water | 130.0 |
| Defoamer | 0.75 |
| Acid phosphate surfactant | 9.0 |
| Nonyl phenyl-ethylene oxide-based surfactant | 9.0 |
| Yellow Iron oxide | 0.45 |
| Rutile titanium dioxide | 210.0 |
| Cryptocrystalline silica | 250.0 |
| Novaculite silica | 250.0 |
| Deionized water | 9.0 |
| Butyl Carbitol* acetate | 10.0 |

*Union Carbide Corp.

A sample was applied by 3-mil Bird coater to Leneta paper and baked 2 minutes at 250° F. (Hot air oven).

A sample was cation exchanged to pH 2.35; other portions were acid catalyzed with paratoluene solfonic acid (PTSA).

| Sample | pH | MEK Replicates |
| --- | --- | --- |
| As is | 4.5 | 20, 21 |
| Cation exch. | 2.35 | 25, 42 |
| 0.25%, PTSA, 40% sol | 2.79 | 38, 47, 50 |
| 0.50% PTSA | 2.12 | 35, 55, 60 |

| Sample | pH | MEK Replicates |
| --- | --- | --- |
| 1.0% PTSA | 1.69 | 45, 48, 57 |

Two hour water spots showed no effect on any of these.

EXAMPLE 3

Another paint was made, but with Novaculite silica replaced by Cryptocrylstalline silica, weight/weight basis. Samples of it and a semi-commercial similar control paint were similarly applied and cured (both catalyzed with 0.7% of 40% PTSA in isopropanol.

| | MEK Rubs | Control Coating |
| --- | --- | --- |
| 3 mil, 2 min./250° F. | 54, 60 rubs | 30, 35 MEK rubs |
| 2 mil, 90 sec./250° F. | 50 | 11 MEK rubs |

EXAMPLE 4

A set of 30 PVC paint was made as follows:

| Letdown A | | Letdown B | | Letdown C | |
| --- | --- | --- | --- | --- | --- |
| Latex | 805.9 | Latex | 777.2 | Latex | 259.1 |
| Defoamer | 2.85 | TMGU | 194.3 | DDEU | 64.8 |
| *Grind | 856.6 | Defoamer | 2.85 | Defoamer | 0.95 |
| | | Nonionic | | Nonionic | |
| | | surfactant | 3.0 | surfactant | 1.0 |
| | | D.I. H₂O | 100 | D.I. H₂O | 33.0 |
| | | *Grind | 856.6 | *Grind | 285.5 |

| *GRIND | Grams |
| --- | --- |
| Deionized water | 583.2 |
| Defoamer | 3.9 |
| Acid Phosphate Surfactant | 46.8 |
| Nonionic surfactant | 46.5 |
| Yellow iron oxide | 1,063.2 |
| Carbon black | 23.4 |
| Red iron oxide | 800.4 |
| Novaculite silica | 858.6 |
| Deionized water | 20.4 |

All three were applied to Leneta paper by a 3 mil Bird coater and baked 2½ min. at 250° F.

| | A | B | C |
| --- | --- | --- | --- |
| MEK rubs | 24 | 6 | 6–8 |
| H₂O rubs | 185 | 50–100 | 55 |

Samples of all were cation exchanged, and applied by 2-mil Bird coater to Leneta paper; cure ladders were run.

| | Cure Time and Temperature (°F.) | | | |
| --- | --- | --- | --- | --- |
| | 1 min. | 2 min. | 3 min. | 4 min. |
| A, 150° F. | 12 MEK | 23 | 22 | 33 |
| A, 250° F. | 77 | 70** | >200 | 175 |
| B, 150° F. | 22 | 38 | 38 | 75 |
| B, 250° F. | >200 | >200 | >200 | >200 |
| C, 150° F. | 50 | >200 | >200 | >200 |
| C, 250° F. | >200 | >200 | >200 | >200 |

**Rechecked, second reading >200 rubs.

Although not as fast to cure as with crosslinker present, cure is still good at temperatures well below those where cure is obtainable with melamines (typically 300° F. or greater.).

EXAMPLE 5

Stable, room temperature self-crosslinking latexes without the use of glycoluril or melamine resins were produced. This is of particular importance of consumer trade sales uses, as the elimination of external crosslinker reduces the potential formaldehyde emissions by a factor of about 100.

Three latexes were evaluated. Latex A was precoalesced with 2% hexyl Cellosolve (Union Carbide Corp.) by weight to assure room temperature coalescence; the other two latexes, B and C, were soft enough to coalesce without additives. Samples of each were cation exchanged with Amberlite 200 CH protonated cation exchange resin to a pH of about 1.7–1.8. Control samples were not exchanged.

Each of the 6 samples were applied to glass plates with a 3 mil Bird applicator in a room held at 75° F., 50% relative humidity, and allowed to air dry. Cure development was measured by pencil hardness at various times.

| Latex compositions: | | | |
| --- | --- | --- | --- |
| | Latex A | Latex B | Latex C |
| Butyl acrylate | 39.1% | 50.5% | 57.8% |
| Methyl methacrylate | 49% | 37.6% | 30.3% |
| Hydroxyethyl acrylate | 6% | 6% | 6% |
| n-Methylol acrylamide | 1.9% | 1.9% | 1.9% |
| Methacrylic acid | 4% | 4% | 4% |
| Tg (Calculated) | 16–17° C. | 0° C. | −10° C. |

| Results: | | | |
| --- | --- | --- | --- |
| | Pencil Hardness @ Dry time | | |
| | 1 hour | 3 hours | 24 hours |
| Latex A + 2% HC | | | |
| as is | <5B | <5B | <5B |
| exchanged | 2B | 2B | 2B |
| Latex B | | | |
| as is | <5B | <5B | <5B |
| exchanged | 2B | 2B | 2B |
| Latex C | | | |
| as is | <5B | <5B | <5B |
| exchanged | 2B | B | HB |

In all three cases, the cation exchanged latex exhibited good hardness development as compared with the unexchanged control. The final hardness on all three ion exchanged latexes was about the same including the softest one which was slightly harder.

EXAMPLE 6

A pigment dispersion was prepared as follows:

| | Grams |
| --- | --- |
| Add and mix at low speed for 15 minutes: | |
| Deionized water | 150.0 |
| Hydroxyethyl Cellulose Thickener | 1.5 |
| Defoamer | 2.0 |
| Acidic Phosphate Surfactant | 5.0 |
| Nonionic Surfactant | 5.0 |
| Add and disperse for 15 minutes at high speed: | |
| Untreated Rutile Titanium Dioxide | 175.0 |
| Water-washed Hydrous clay | 60.0 |
| Paint letdowns were prepared as follows: | |
| Add and mix at low speed for 15 minutes: | |
| Deionized water | 6.3 |
| Propylene glycol | 10.0 |
| Defoamers | 1.8 |
| Latex | 138.5 |
| Coalescent | 2.8 |

|  | Grams |
|---|---|
| Thickener | 0.5 |

To each letdown was added, with mixing, 102.3 grams of the above grind.

In the first case, the latex used had a composition comprising methyl methacrylate, butyl acrylate, hydroxyethyl acrylate, N-methylol acrylamide, and methacrylic acid, with a calculated Fox Tg of 16C. This was identified as Sample A.

In the second case, the same latex was used, but 20% of its was replaced by an equal amount of Cymel 1175 (DDEU, American Cyanamid). This was identified as Sample C.

Half of each paint was set aside for later use. The other half of each was mixed with about 30 grams of Amberlite 200 CH (protonated cation exchange resin, Rohm and Haas). Sample A exchanged was identified as Sample B, and Sample C exchanged was identified as Sample D.

pH of each was measured before and after exchange and after 1 week at room temperature; the coatings were essentially stable.

| Sample I.D. | Paint with Latex only | | Paint with Latex + DDEU | |
|---|---|---|---|---|
|  | As-is A | Exchanged B | As-is C | Exchanged D |
| pH Initial | 3.4 | 1.8 | 4.1 | 1.7 |
| pH, 1 Week | 3.5 | 1.9 | 4.2 | 1.8 |

Samples of each paint were applied by a 0.003 inch Bird applicator to glass panels, and allowed to dry under ambient conditions (70° F., 30% RH) for 1 week. Initial tests were conducted after 24 hours.

|  | Paint with Latex only | | Paint with Latex + DDEU | |
|---|---|---|---|---|
|  | As-is | Exchanged | As-is | Exchanged |
| 24 Hour Air Dry |  |  |  |  |
| MEK Rubs | 20 | 31 | 20 | 22 |
| Water Rubs | 25 | >200 | 7 | 48 |
| 1 Week Air Dry |  |  |  |  |
| MEK Rubs | 28 | 53 | 22 | 21 |
| Water Rubs | 78 | >200 | 8 | 172 |
| Water Soak (Hours to fail) | 3.5 | >30 | 2.5 | 30 |
| Detergent Spot (Hours to fail) | 2 | 6 | 2 | 4 |

In the detergent spot test, concentrated Formula 409 (Clorox Co., Oakland, Calif.) is applied to the coating and allowed to remain until delamination or dissolution occurs.

From these results it is obvious that cation exchange has given a coating which is stable, and which air dries to provide a tough, water- and solventresistant coating without the use of external crosslinker. In this particular formula, properties are superior to those in which the external crosslinker is used.

EXAMPLE 8

A series of latexes was prepared according to the procedures of prior examples. The only difference is in the level of N-methylol acrylamide, which varied from 1.9% of monomer mix to 0%. This had the effect of lowering the acetone-insolubles in the final polymer, as some branching is caused by the reactive monomer. Comonomers included butyl acrylate, methyl methacrylate, hydroxyl ethyl acrylate, and methacrylic acid.

It is well known in the art to use methylol amide monomers to cause self-cure of polymers without the use of external crosslinkers. While one would predict that cation exchange would accelerate this reaction, it is not expected that the resultant coating would be stable and, in fact, perform better than the coating containing external crosslinker.

Prior examples clearly demonstrated the superiority of this approach over using external crosslinker. This example further shows that a crosslinking reaction proceeds whether the N-methylol acrylamide is present or not, indicating that the cation exchange process is effective with, but not limited to conventional amide crosslinking chemistry.

The degree of internal crosslinking in each latex particle (gel content) is determined by casting a film and measuring the acetone insolubles after it is dried. This is not an absolute indicator of molecular weight, but it does give an approximate value.

For the following study each latex was applied to a glass plate using a 0.003 inch Bird applicator. They were then dried for 4 minutes at 250° F. and allowed to cool before testing. Cure was measured by resistance to methyl ethyl ketone, by rubbing with a saturated rag. Replicate panels were made in all cases, and cure was measured at least twice on each panel. Results reported are averages of all determinations.

| Latex I.D. | % NMA | % Gel Content | Cure, As is | Cure, Ion Exchanged |
|---|---|---|---|---|
| 74A | 1.9 | 88.1 | >300, soft | >300, slightly soft |
| 74B | 0.95 | 85.3 | >300, v. soft | >300, slightly soft |
| 78A | 0.48 | 77.6 | 198 | >300, soft |
| 78B | 0.24 | 70.6 | 74 | >300, soft |
| 78C | 0.12 | 63.2 | 85 | 164 |
| 74C | 0 | 38.2 | 26 | 93 |

To determine the effect of molecular weight on cure, further latexes were made using hexanediol diacrylate (HDDA) to build the gel content. No N-methylol acrylamide was used. Films were prepared and tested as above.

| Latex I.D. | % HDDA | % Gel Content | Cure, As Is | Cure, Ion Exchanged |
|---|---|---|---|---|
| 82A | 2.0 | 74.4 | 40 | 205 |
| 82B | 1.0 | 82.2 | 31 | 145 |
| 82C | 0.5 | 65.9 | 25 | 91 |

Although not a direct relationship with level of diacrylate, all three show a marked increase in gel content over the 74C which contains no crosslinking monomer of any kind. The cure response in each case in minimal without cation exchange, but with exchange they all show a significant increase which is larger as the level of diacrylate increases.

This clearly shows that cation exchange is promoting a reaction quite independent of methylol amide monomer, and which is enhanced by the presence of higher molecular weight polymer.

EXAMPLE 9

An acrylic latex containing dimethyl amino ethyl methacrylate was prepared. A portion was treated with Amberlite 200 CH protonated cation exchange resin (Rohm and Haas) to lower the pH from 3.67 to 1.95. Samples before and after exchange were applied to a glass plate with a .003 inch Bird applicator and baked 4 minutes at 250° F. They were then checked for cure using methyl ethyl ketone rubs.

Without exchange: 8–10 rubs
With exchange: 7–11 rubs

This clearly indicates that the cure increase noted in the prior examples is not seen in latex containing dimethyl amino ethyl methacrylate.

I claim:

1. A self-curing paint coating composition substantially free of cations and comprising a self-curing emulsion polymer, said emulsion polymer comprising copolymerized monomers on a weight basis, between 0.6% and 30% functional monomers selected from carboxyl monomers and hydroxyl monomers, between 0.1% and 10% alkylol acrylamide monomers, and between 60% and 99.4% after ethylenically unsaturated monomers, but substantially free of amine monomers and amine functional groups, where said self-curing emulsion polymer is ion-exchanged to remove cations therefrom, said self-curing emulsion polymer having a pH below 2.5.

2. The coating composition in claim 1 where the alkylol acryalamide is an alkyl alkylol acrylamide.

3. The coating is claim 1 where the self-curing emulsion polymer comprises an acrylic copolymer.

4. The coating in claim 1 where the coating is pigmented with an ionexchanged pigment.

5. A thermosetting coating composition containing a polymeric binder produced by emulsion copolymerizing ethylenically unsaturated monomers in an aqueous polymerization medium, and in the presence of surfactants and initiators, comprising:

copolymerizing ethylenically unsaturated monomers, including carboxyl or hydroxyl functional monomers and alkylol acrylamide monomer, but excluding amine monomers, to produce a functionally reactive self-curing emulsion polymer containing alkylol acrylamide groups and functional carboxyl or hydroxyl groups;

treating the self-curing emulsion polymer by contact with an ion exchange resin to remove cations from the functional emulsion polymer and produce a pH of less than 2.5, where said functionally reactive emulsion polymer is self-curing, and said paint coating is adapted to self-cure upon application to a substrate by crosslinking alkylol acrylamide groups with functional hydroxyl or carboxyl groups to produce a thermoset paint coating film.

* * * * *